United States Patent
Aoki et al.

(10) Patent No.: US 9,794,472 B2
(45) Date of Patent: Oct. 17, 2017

(54) IMAGING DEVICE AND FOCUSING CONTROL METHOD

(71) Applicant: FUJIFILM Corporation, Tokyo (JP)

(72) Inventors: Takashi Aoki, Saitama (JP); Yasuo Ohtsuki, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/227,186

(22) Filed: Aug. 3, 2016

(65) Prior Publication Data

US 2016/0344922 A1 Nov. 24, 2016

Related U.S. Application Data

(63) Continuation of application No. PCT/JP2014/083356, filed on Dec. 17, 2014.

(30) Foreign Application Priority Data

Mar. 18, 2014 (JP) .................................. 2014-054992

(51) Int. Cl.
  H04N 5/232 (2006.01)
  G02B 7/34 (2006.01)
  (Continued)

(52) U.S. Cl.
  CPC ........... *H04N 5/23212* (2013.01); *G02B 7/34* (2013.01); *G02B 7/36* (2013.01); *H04N 5/3696* (2013.01); *H04N 9/045* (2013.01); *H04N 9/077* (2013.01)

(58) Field of Classification Search
  CPC .................................................. H04N 5/3696
  See application file for complete search history.

(56) References Cited

U.S. PATENT DOCUMENTS 8,446,501 B2 * 5/2013 Nakagawa ............... G02B 7/34
  348/294
9,277,150 B2 * 3/2016 Ishii .................... H04N 5/23212
  (Continued)

FOREIGN PATENT DOCUMENTS

JP 2010-152161 A 7/2010
JP 2011-135191 A 7/2011
  (Continued)

OTHER PUBLICATIONS

International Search Report for PCT/JP2014/083356 (PCT/ISA/210) dated Mar. 31, 2015.
  (Continued)

*Primary Examiner* — Roberto Velez
*Assistant Examiner* — Cynthia Segura
(74) *Attorney, Agent, or Firm* — Birch, Stewart, Kolasch & Birch, LLP

(57) ABSTRACT

The present invention provides an imaging device and a focusing control method capable of enhancing accuracy of a focusing control regardless of subjects even when levels of detection signals of phase difference detection pixels are low. A phase difference AF processing unit (19) generates a defocus amount (Df1) from a result of a correlation operation performed with respect to detection signals obtained by adding up detection signals of plural phase difference detection pixels (52A, 52B) in a pair line (PL1) present in a selected AF area (53) and detection signals of phase difference detection pixels (52A, 52B) in pair lines (PL2, PL3) present in a selected direction among plural directions which are crossing directions crossing an X direction with respect to each of the plural phase difference detection pixels (52A, 52B) in the pair line (PL1). A system control unit (11) performs a focusing control based on the defocus amount (Df1).

6 Claims, 10 Drawing Sheets

(51) Int. Cl.
*H04N 9/04* (2006.01)
*G02B 7/36* (2006.01)
*H04N 9/077* (2006.01)
*H04N 5/369* (2011.01)

(56) References Cited

U.S. PATENT DOCUMENTS

| | | | | |
|---|---|---|---|---|
| 2009/0278966 A1* | 11/2009 | Kusaka | ............... | G02B 7/36 348/294 |
| 2010/0188522 A1* | 7/2010 | Ohnishi | ............... | H04N 5/2254 348/222.1 |
| 2011/0096211 A1* | 4/2011 | Oikawa | ............... | G03B 13/36 348/273 |
| 2011/0228127 A1* | 9/2011 | Nakagawa | ............... | G02B 7/34 348/222.1 |
| 2012/0188425 A1* | 7/2012 | Kita | ............... | H04N 5/23212 348/294 |
| 2013/0088621 A1* | 4/2013 | Hamada | ............... | H04N 5/3696 348/281 |
| 2013/0265483 A1 | 10/2013 | Tamaki | | |
| 2014/0211059 A1* | 7/2014 | Aoki | ............... | G02B 7/34 348/311 |
| 2014/0240550 A1* | 8/2014 | Taniguchi | ............... | H04N 5/217 348/239 |
| 2016/0353009 A1* | 12/2016 | Aoki | ............... | G02B 7/34 |
| 2016/0353010 A1* | 12/2016 | Tanaka | ............... | H04N 5/3656 |
| 2017/0171481 A1* | 6/2017 | Honda | ............... | H04N 5/3696 |

FOREIGN PATENT DOCUMENTS

| | | |
|---|---|---|
| JP | 2013-186187 A | 9/2013 |
| JP | 2013-218137 A | 10/2013 |

OTHER PUBLICATIONS

Written Opinion of the International Searching Authority for PCT/JP2014/083356 (PCT/ISA/237) dated Mar. 31, 2015.
International Preliminary Report on Patentability for PCT/JP2014/083356 (PCT/IB/373) dated Sep. 20, 2016 with an English Translation thereof.

* cited by examiner

(12) United States Patent

IMAGING DEVICE AND FOCUSING CONTROL METHOD

CROSS-REFERENCE TO RELATED APPLICATIONS

This application is a Continuation of PCT International Application No. PCT/JP2014/083356 filed on Dec. 17, 2014, which claims priority under 35 U.S.C §119(a) to Japanese Patent Application No. 2014-054992 filed on Mar. 18, 2014. Each of the above application(s) is hereby expressly incorporated by reference, in its entirety, into the present application.

BACKGROUND OF THE INVENTION

1. Field of the Invention

The present invention relates to an imaging device and a focusing control method.

2. Description of the Related Art

In recent years, according to the increase in resolution of an imaging element such as a charge coupled device (CCD) image sensor or a complementary metal oxide semiconductor (CMOS) image sensor, demand for information devices having an imaging function, such as a digital still camera, a digital video camera, a mobile phone such as a smart phone, or a personal digital assistant (PDA) has rapidly increased. Such an information device having an imaging function is referred to as an imaging device.

In such an imaging device, as a focusing control method for focusing on a main subject, a phase difference auto-focus (AF) method (for example, see JP2011-135191A, JP2010-152161A, and JP2013-218137A) is employed.

In a solid-state imaging element mounted on an imaging device that performs a focusing control based on the phase difference AF method, a configuration in which pairs of phase difference detection pixels in which light shielding film openings are eccentric in opposite directions are discretely arranged on an entire imaging surface is used.

Such a phase difference detection pixel has a low sensitivity compared with that of a normal imaging pixel in which a light shielding film opening is not eccentric with respect to a photoelectric conversion unit. Thus, in a case where a subject has a low luminous intensity, a detection signal level of the phase difference detection pixel is lowered.

In order to compensate for the reduction of the detection signal level, if a gain-up process is merely performed to perform a correlation operation, an error occurs in a result of the correlation operation. Accordingly, a process of increasing a signal level by adding up detection signals of phase difference detection pixels is performed.

JP2011-135191A discloses a configuration in which detection signals of plural phase difference detection pixels which are diagonally arranged are added up and a correlation operation is performed using detection signals after addition to calculate a defocus amount.

Further, JP2010-152161A and JP2013-218137A disclose a configuration in which detection signals of plural phase difference detection pixels which are arranged at the same horizontal positions are added up and a defocus amount is calculated based on detection signals after addition.

SUMMARY OF THE INVENTION

In all of the imaging devices disclosed in JP2011-135191A, JP2010-152161A, and JP2013-218137A, detection signals of plural phase difference detection pixels which are arranged in a specific direction are added up, and a correlation operation is performed using detection signals after addition.

However, there is a case where a bright subject portion is image-formed in a part of plural phase difference detection pixels and a dark subject portion is image-formed in the other part of the plural phase difference detection pixels, that is, a case where an edge of a subject is present in a crossing pattern in a specific direction. In this case, since the edge becomes blurred due to addition of detection signals, an error occurs in a result of a correlation operation of detection signals after addition.

In order to solve the above-mentioned problems, an object of the invention is to provide an imaging device and a focusing control method capable of enhancing accuracy of a focusing control regardless of subjects even when levels of detection signals of phase difference detection pixels are low.

According to an aspect of the invention, there is provided an imaging device comprising: an imaging element that includes a pair line in which a plurality of pairs of a first signal detection unit that detects a signal corresponding to a beam that passes through a divided region among divided regions of a pupil region divided in a specific direction in an imaging optical system and a second signal detection unit that detects a signal corresponding to a beam that passes through the other divided region is arranged in the specific direction, in which the plurality of pair lines is arranged in a direction orthogonal to the specific direction; a defocus amount generation unit that generates a defocus amount from a result of a correlation operation performed with respect to a plurality of detection signals obtained by adding up detection signals of the plurality of first signal detection units in an arbitrary pair line present in an area where the plurality of pair lines is arranged and detection signals of the first signal detection units in a different pair line in the area, present in a crossing direction crossing the specific direction with respect to each of the plurality of respective first signal detection units, and a plurality of detection signals obtained by adding up detection signals of the second signal detection units that forms pairs in combination with each of the plurality of first signal detection units in the arbitrary pair line and detection signals of the second signal detection units in the different pair line in the area, present in the crossing direction with respect to the second signal detection units; a direction determination unit that determines a direction where a reliability of the result of the correlation operation becomes a maximum among a plurality of directions as the crossing direction; and a focusing control unit that performs a focusing control for the imaging optical system based on the defocus amount generated by the defocus amount generation unit from the result of the correlation operation performed using the direction determined by the direction determination unit as the crossing direction.

According to another aspect of the invention, there is provided a focusing control method comprising: a defocus amount generation step of generating a defocus amount from a result of a correlation operation performed with respect to a plurality of detection signals obtained by adding up detection signals of the plurality of first signal detection units in an arbitrary pair line present in an area where the plurality of pair lines is arranged and detection signals of the plurality of first signal detection units in a different pair line in the area, present in a crossing direction crossing the specific direction with respect to the plurality of respective first signal detection units, and a plurality of detection signals obtained by adding up detection signals of the plurality of second signal detection units that forms pairs in combination with each of the plurality of first signal detection units in the arbitrary pair line and detection signals of the plurality of second signal detection units in the different pair line in the area, present in the crossing direction with respect to the second signal detection units, the detection signals being output from an imaging element that includes a pair line in which a plurality of pairs of a first signal detection unit that detects a signal corresponding to a beam that passes through a divided region among divided regions of a pupil region divided in a specific direction in an imaging optical system and a second signal detection unit that detects a signal corresponding to a beam that passes through the other divided region is arranged in the specific direction, in which the plurality of pair lines is arranged in a direction orthogonal to the specific direction; a direction determination step of determining a direction where a reliability of the result of the correlation operation becomes a maximum among a plurality of directions as the crossing direction; and a focusing control step of performing a focusing control for the imaging optical system based on the defocus amount generated in the defocus amount generation step from the result of the correlation operation performed using the direction determined in the direction determination step as the crossing direction.

According to the invention, it is possible to provide an imaging device and a focusing control method capable of enhancing accuracy of a focusing control regardless of subjects even when levels of detection signals of phase difference detection pixels are low.

DESCRIPTION OF THE PREFERRED EMBODIMENTS

Hereinafter, embodiments of the invention will be described with reference to the accompanying drawings.

Figure 1:
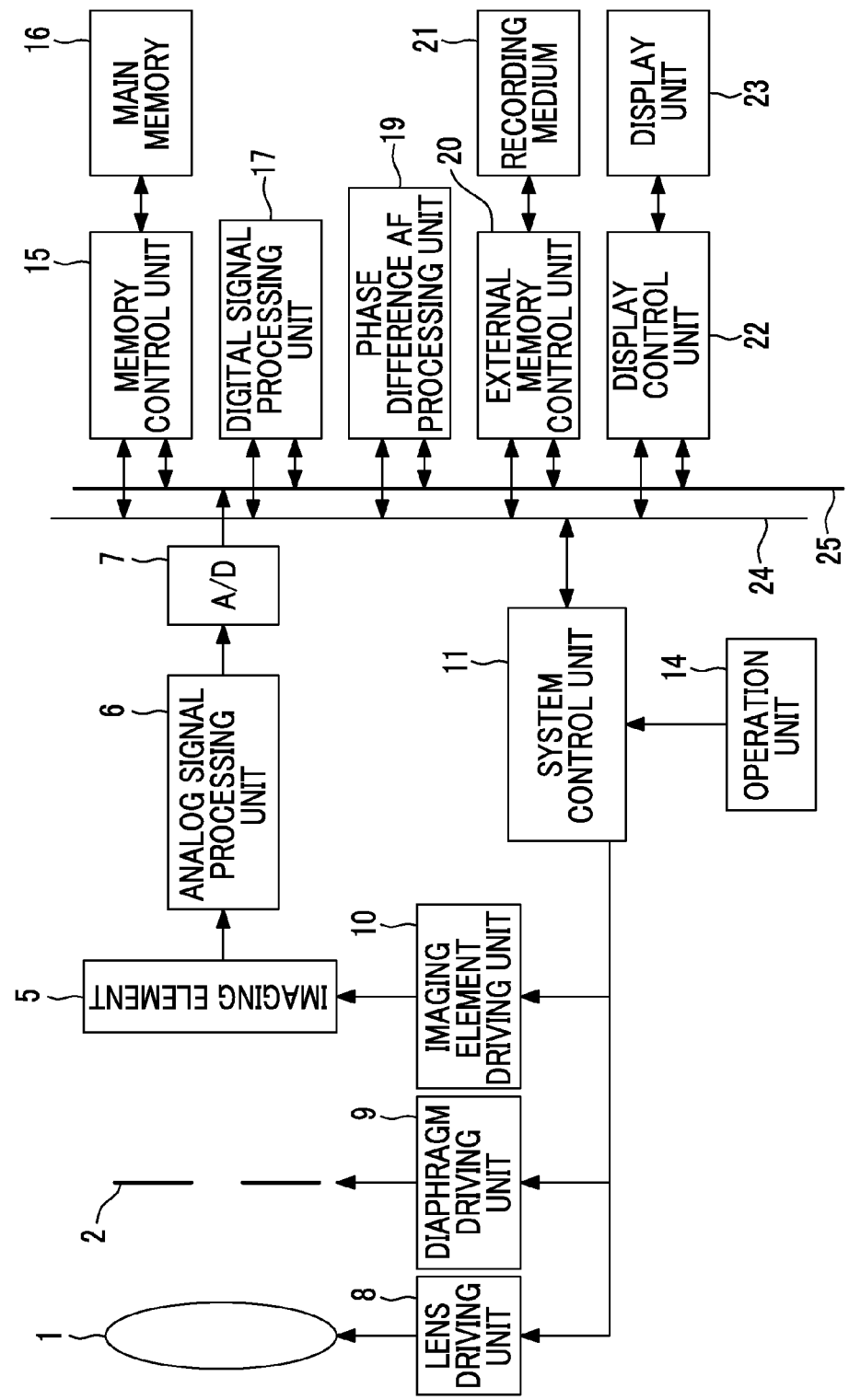
FIG. 1 is a diagram illustrating a schematic configuration of a digital camera which is an example of an imaging device for describing an embodiment of the invention.

FIG. 1 is a diagram illustrating a schematic configuration of a digital camera which is an example of an imaging device for describing an embodiment of the invention.

The digital camera shown in FIG. 1 includes a lens device that includes an imaging lens 1 that includes a focus lens for focus adjustment, a zoom lens, or the like and a diaphragm 2. The lens device forms an imaging optical system.

The lens device shown in FIG. 1 is fixed to a camera main body, but may be exchanged with another lens device. The imaging lens 1 may include at least the focus lens. And the focus lens may be a single focus lens that performs focus adjustment by moving the entirety of the lens system.

The digital camera includes an imaging element 5 of a CCD type, a CMOS type, or the like that images a subject through the lens device, an analog signal processing unit 6 that is connected to an output end of the imaging element 5 and performs analog signal processing such as a correlated double sampling process, and an A/D conversion circuit 7 that converts an analog signal output from the analog signal processing unit 6 into a digital signal.

The analog signal processing unit 6 and the A/D conversion circuit 7 are controlled by a system control unit 11. The analog signal processing unit 6 and the A/D conversion circuit 7 may be provided in the imaging element 5.

The system control unit 11 that generally controls the entirety of an electric control system of the digital camera performs a focusing control for controlling a lens driving unit 8 and driving the focus lens included in the imaging lens 1 to be focused on a main subject, or adjusts the position of the zoom lens included in the imaging lens 1. Further, the system control unit 11 controls the degree of opening of the diaphragm 2 through a diaphragm driving unit 9 to adjust a light exposure value.

Further, the system control unit 11 drives the imaging element 5 through an imaging element driving unit 10, and outputs a subject image captured through the imaging lens 1 as a captured image signal. An instruction signal from a user is input to the system control unit 11 through an operation unit 14. The instruction signal includes an instruction signal for instructing execution of a focusing control of the imaging optical system.

Further, the electric control system of the digital camera includes a main memory 16, a memory control unit 15 connected to the main memory 16, a digital signal processing unit 17 that generates captured image data by performing an interpolation operation, a gamma correction operation, a RGB/YC conversion process, and the like with respect to a captured image signal output from the A/D conversion circuit 7, a phase difference AF processing unit 19, an external memory control unit 20 to which a detachable and attachably recording medium 21 is connected, and a display control unit 22 to which a display unit 23 mounted on a rear surface or the like of the camera is connected.

The memory control unit 15, the digital signal processing unit 17, the phase difference AF processing unit 19, the external memory control unit 20, and the display control unit 22 are connected to each other through a control bus 24 and a data bus 25, and are controlled by instructions from the system control unit 11.

Figure 2:
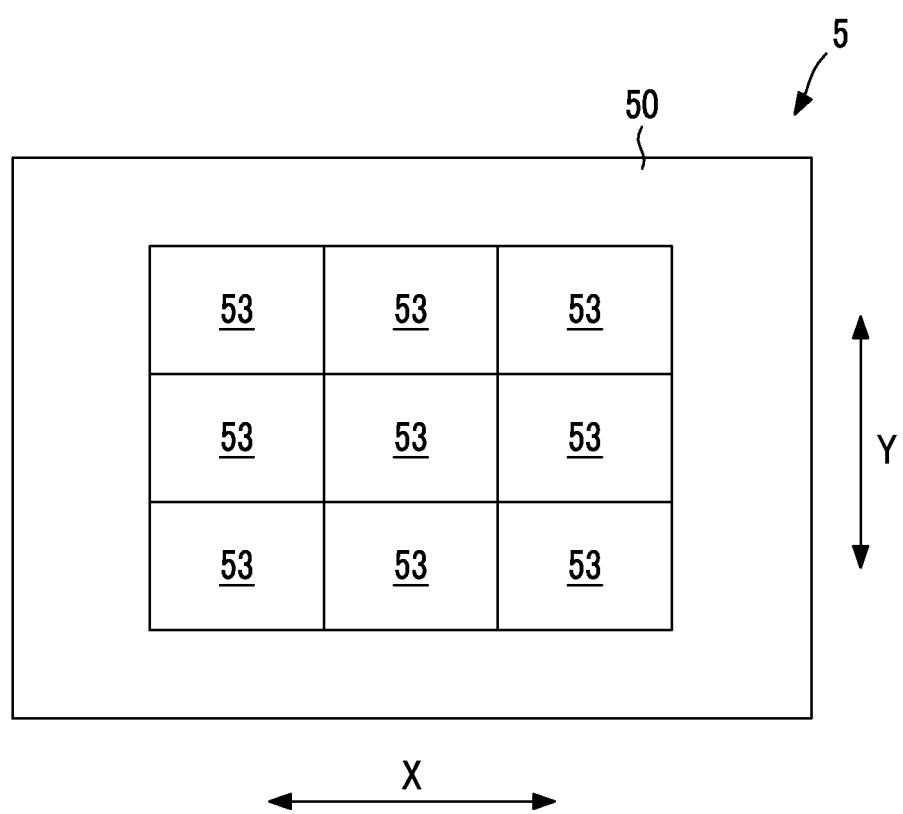
FIG. 2 is a schematic plan view illustrating an overall configuration of an imaging element 5 mounted on the digital camera shown in FIG. 1.

FIG. 2 is a schematic plan view illustrating an overall configuration of the imaging element 5 mounted on the digital camera shown in FIG. 1.

The imaging element 5 includes an imaging surface 50 on which multiple pixels which are arranged in two dimensions in an X direction and in a Y direction orthogonal to the X direction. In the example of FIG. 2, nine AF areas 53 which are target areas for focusing are provided on the imaging surface 50.

The AF area 53 is an area that includes an imaging pixel and a phase difference detection pixel as pixels.

In a portion where the AF areas 53 are excluded on the imaging surface 50, only imaging pixels are disposed. The AF areas 53 may be provided on the imaging surface 50 without a gap.

Figure 3:
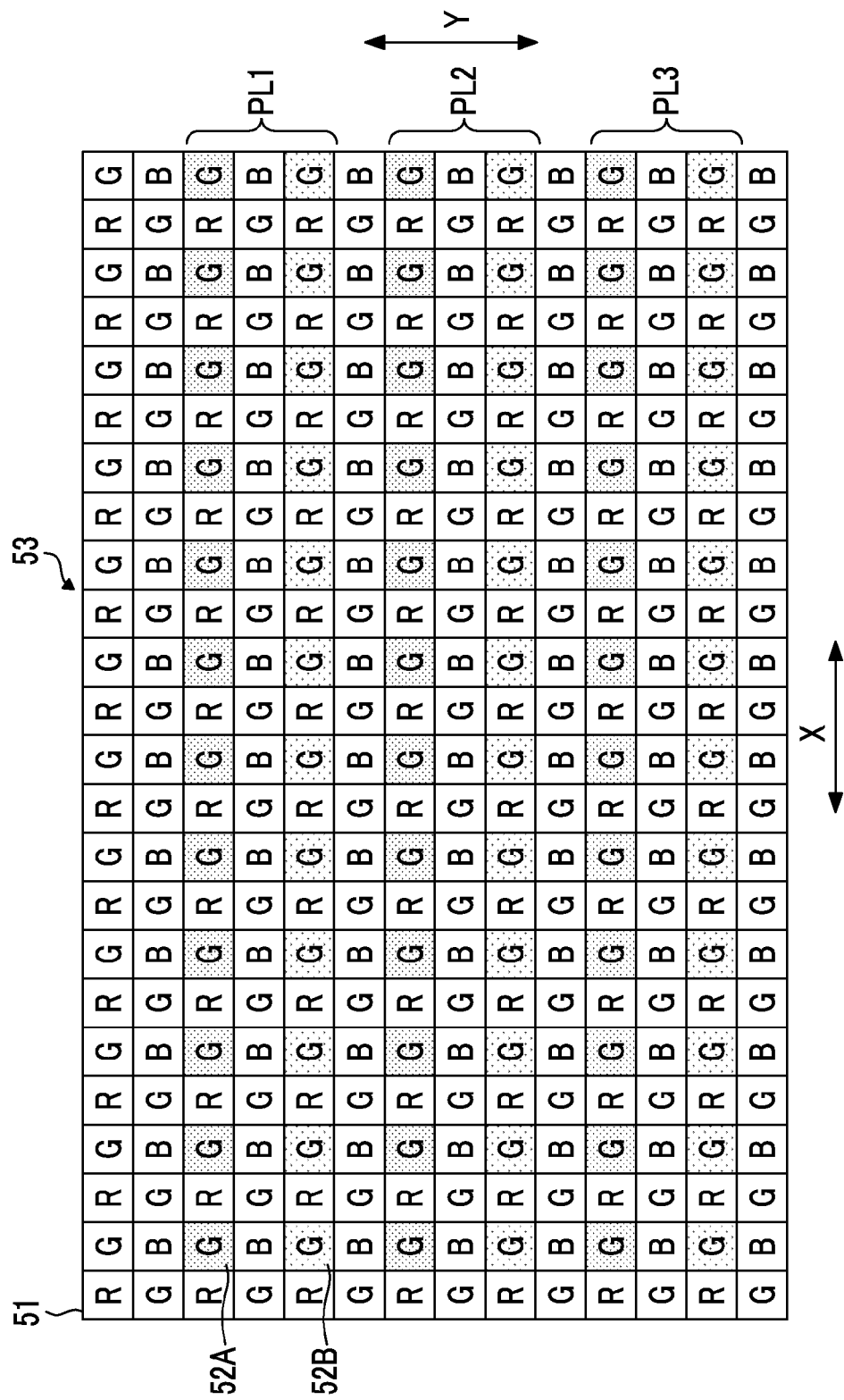
FIG. 3 is a partially enlarged view illustrating a single AF area 53 shown in FIG. 2.

FIG. 3 is a partially enlarged view illustrating a single AF area 53 shown in FIG. 2.

Pixels 51 (square shaped blocks in the figure) are arranged in the AF area 53 in two dimensions. Each pixel 51 includes a photoelectric conversion unit such as a photo diode, and a color filter formed above the photoelectric conversion unit.

In FIG. 3, letter "R" is given to a pixel 51 (may be referred to as R pixel 51) including a color filter (R filter) that transmits red light, letter "G" is given to a pixel 51 (may be referred to as G pixel 51) including a color filter (G filter) that transmits green light, and letter "B" is given to a pixel 51 (may be referred to as B pixel 51) including a color filter (B filter) that transmits blue light. The color filters are arranged in the form of a Bayer array over the entirety of the imaging surface 50.

In the AF area 53, a part of the G pixels 51 (shaded pixels in FIG. 3) are used as the phase difference detection pixels 52A and 52B. In the example of FIG. 3, each G pixel 51 in a third pixel row, a seventh pixel row, and an eleventh pixel row is used as the phase difference detection pixel 52A. Further, the G pixel 51 closest to each G pixel 51 in the column direction Y with respect to each phase difference detection pixel 52A is used as the phase difference detection pixel 52B.

All phase difference detection pixels 52A in an arbitrary row and the phase difference detection pixels 52B of the same color which are respectively closest to all the phase difference detection pixels 52A in the column direction Y form a pair line. In FIG. 3, pair lines PL1, PL2, and PL3 are arranged in the Y direction in the AF area 53, but it is sufficient if plural pair lines are arranged in the AF area 53.

Figure 4:
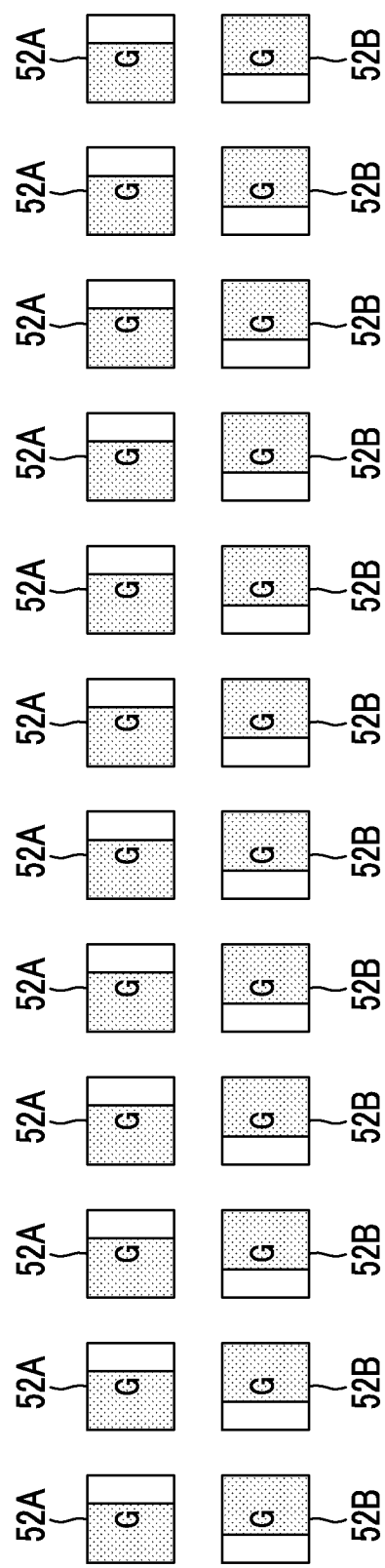
FIG. 4 is a diagram illustrating only phase difference detection pixels 52A and 52B arranged in a pair line shown in FIG. 3.

FIG. 4 is a diagram illustrating only the phase difference detection pixels 52A and 52B in one pair line shown in FIG. 3.

The phase difference detection pixel 52A is a first signal detection unit that receives a beam that passes through one divided region in a pupil region of the imaging lens 1, divided in one direction (the X direction in the example of FIG. 3), and detects a signal depending on the intensity of received light.

The phase difference detection pixel 52B is a second signal detection unit that receives a beam that passes through the other divided region in the pupil region of the imaging lens 1 and detects a signal depending on the intensity of received light.

In the AF area 53, plural pixels 51 other than the phase difference detection pixels 52A and 52B are imaging pixels. Each imaging pixel receives beams that pass through the two divided regions in the pupil region of the imaging lens 1, and detects a signal depending on the intensity of received light.

A light shielding film is provided above the photoelectric conversion unit of each pixel 51, and an opening for defining a light receiving area of the photoelectric conversion unit is formed in the light shielding film.

The center of the opening of the imaging pixel 51 matches the center of the photoelectric conversion unit of the imaging pixel 51. On the other hand, the center of the opening (white portion in FIG. 4) of the phase difference detection pixel 52A is eccentric rightward with respect to the center of the photoelectric conversion unit of the phase difference detection pixel 52A.

Further, the center of the opening (white portion in FIG. 4) of the phase difference detection pixel 52B is eccentric leftward with respect to the center of the photoelectric conversion unit of the phase difference detection pixel 52B. Here, the right direction represents one direction along the X direction shown in FIG. 3, and the left direction represents the other direction along the X direction.

Figure 5:
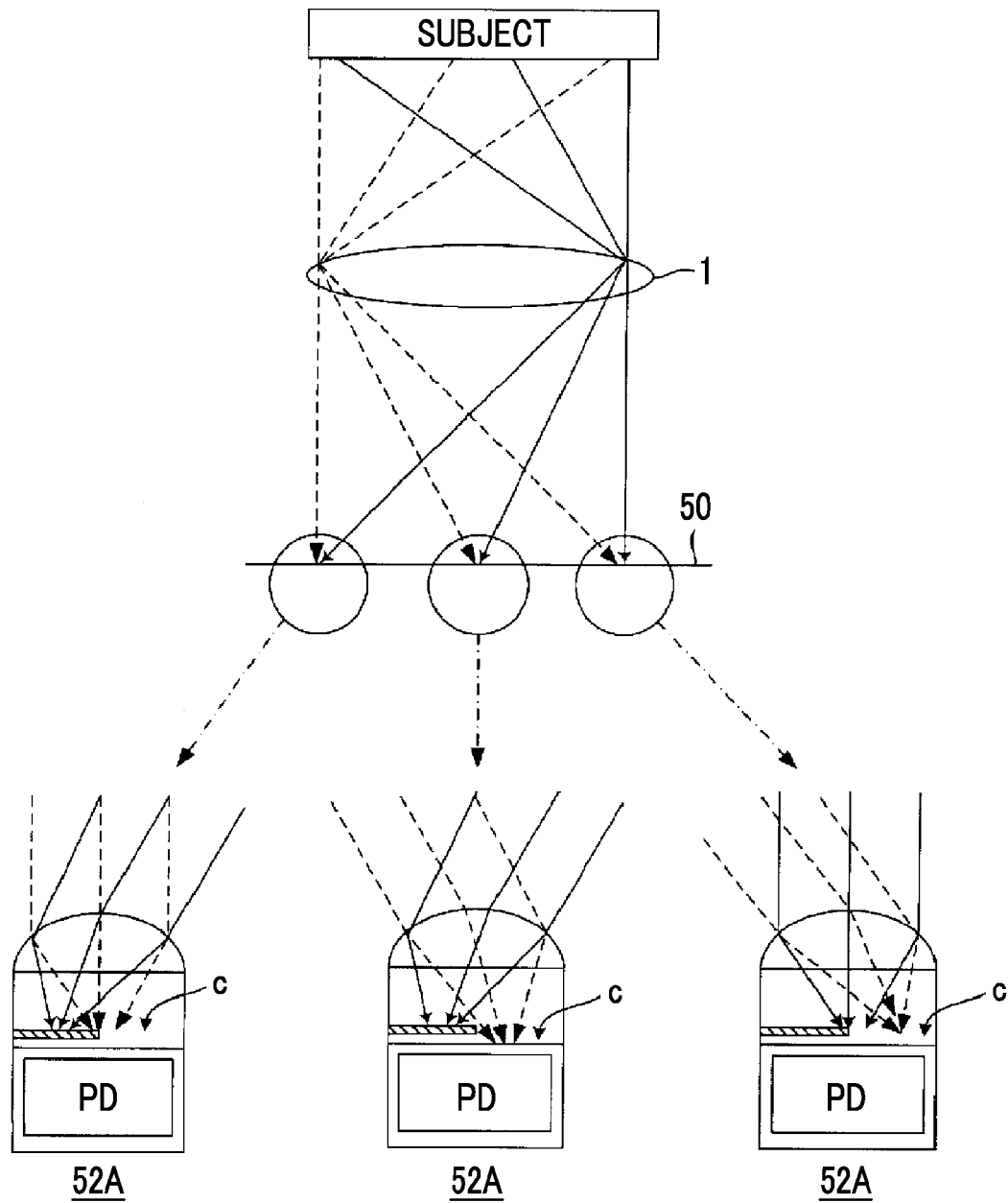
FIG. 5 is a diagram illustrating a method for determining a direction where a reliability of a correlation operation after addition becomes a maximum.

FIG. 5 is a diagram illustrating a sectional configuration of the phase difference detection pixel 52A in the X direction. As shown in FIG. 5, an opening c of the phase difference detection pixel 52A is eccentric rightward with respect to the photoelectric conversion unit (PD).

As shown in FIG. 5, by covering one side of the photoelectric conversion unit by the light shielding film, it is possible to selectively shield light incident in a direction opposite to a side where the photoelectric conversion unit is covered by the light shielding film.

With such a configuration, it is possible to detect, using a pixel group that includes the phase difference detection pixels 52A which are positioned in an arbitrary row and a pixel group that includes the phase difference detection pixels 52B which are disposed at the same distance in one direction with respect to each of the phase difference detection pixels 52A of the pixel group, a phase difference in the row direction X in images respectively captured by the two pixel groups.

The phase difference AF processing unit 19 shown in FIG. 1 generates a defocus amount using any one method of the following two methods according to the brightness of a subject. The phase difference AF processing unit 19 functions as a defocus amount generation unit.

(First Method)

The phase difference AF processing unit 19 performs a correlation operation with respect to detection signal groups of the phase difference detection pixels 52A and the phase difference detection pixels 52B for each pair line in one selected AF area 53 from nine AF areas 53 through a user operation, and calculates a phase difference which is a relative deviation amount between an image captured by the phase difference detection pixels 52A and an image captured by the phase difference detection pixels 52B.

The phase difference AF processing unit 19 generates a defocus amount Dfr which is a movement value of the focus lens necessary for matching an image formation surface of a main subject produced by the imaging lens 1 and the imaging surface 50 of the imaging element 5, based on the phase difference. The phase difference AF processing unit 19 calculates an average of the defocus amounts Dfr calculated with respect to respective pair lines, and notifies the system control unit 11 of a defocus amount Df obtained by averaging the defocus amounts Dfr.

(Second Method)

The phase difference AF processing unit 19 performs a first addition process of adding detection signals of the plural phase difference detection pixels 52A (may be referred to as a first addition reference pixel group) arranged in the X direction in an arbitrary pair line and detection signals of phase difference detection pixels 52A in a different pair line positioned in a crossing direction crossing the X direction with respect to each of the plural phase difference detection pixels 52A, in a selected AF area 53 (corresponding to an area where plural pair lines are arranged).

Further, the phase difference AF processing unit 19 performs a second addition process of adding detection signals of phase difference detection pixels 52B (may be referred to as a second addition reference pixel group) that form pairs in combination with the respective phase difference detection pixels 52A of the addition reference pixel group in the arbitrary pair line and detection signals of phase difference detection pixels 52B in the different pair line positioned in the crossing direction with respect to the phase difference detection pixels 52B.

Further, the phase difference AF processing unit 19 performs a correlation operation (referred to as an addition correlation operation) with respect to a detection signal group of the phase difference detection pixels 52A obtained in the first addition process and a detection signal group of the phase difference detection pixels 52B obtained in the second addition process, and generates a defocus amount Df1 from the result of the addition correlation operation, and notifies the system control unit 11 of the generated defocus amount Df1.

The phase difference AF processing unit 19 may divide the selected AF area 53 into blocks in the Y direction, may add up detection signals of the phase difference detection pixels 52A and 52B in plural pair lines which are present in each block, for each block, to perform an addition correlation operation, and may generate the defocus amount Df1 from the result of the addition correlation operation.

In this case, the phase difference AF processing unit 19 may generate a defocus amount Df2 using the defocus amount Df1 (by averaging plural defocus amounts Df1, for example) generated with respect to the plural blocks, and may notify the system control unit 11 of the defocus amount Df2.

When generating the defocus amount Df1, the phase difference AF processing unit 19 selects one direction from plural settable directions as the crossing direction.

The plural settable directions correspond to directions where straight lines passing through any phase difference detection pixel 52A in the first addition reference pixel group and passing through phase difference detection pixels 52A in each of different pair lines positioned at the AF area 53 extend.

In a case where the phase difference AF processing unit 19 performs an addition correlation operation using each of the plural settable directions as the crossing direction, the phase difference AF processing unit 19 determines a direction where a reliability of the result of the addition correlation operation becomes a maximum (may be referred to as a maximum reliability direction) from the plural directions, and selects and sets the determined direction. The phase difference AF processing unit 19 functions as a direction determination unit.

The phase difference AF processing unit 19 calculates the defocus amount Df1 from the result of the addition correlation operation performed by setting the maximum reliability direction as the crossing direction.

Hereinafter, a method for determining the maximum reliability direction will be described.

Figure 6:
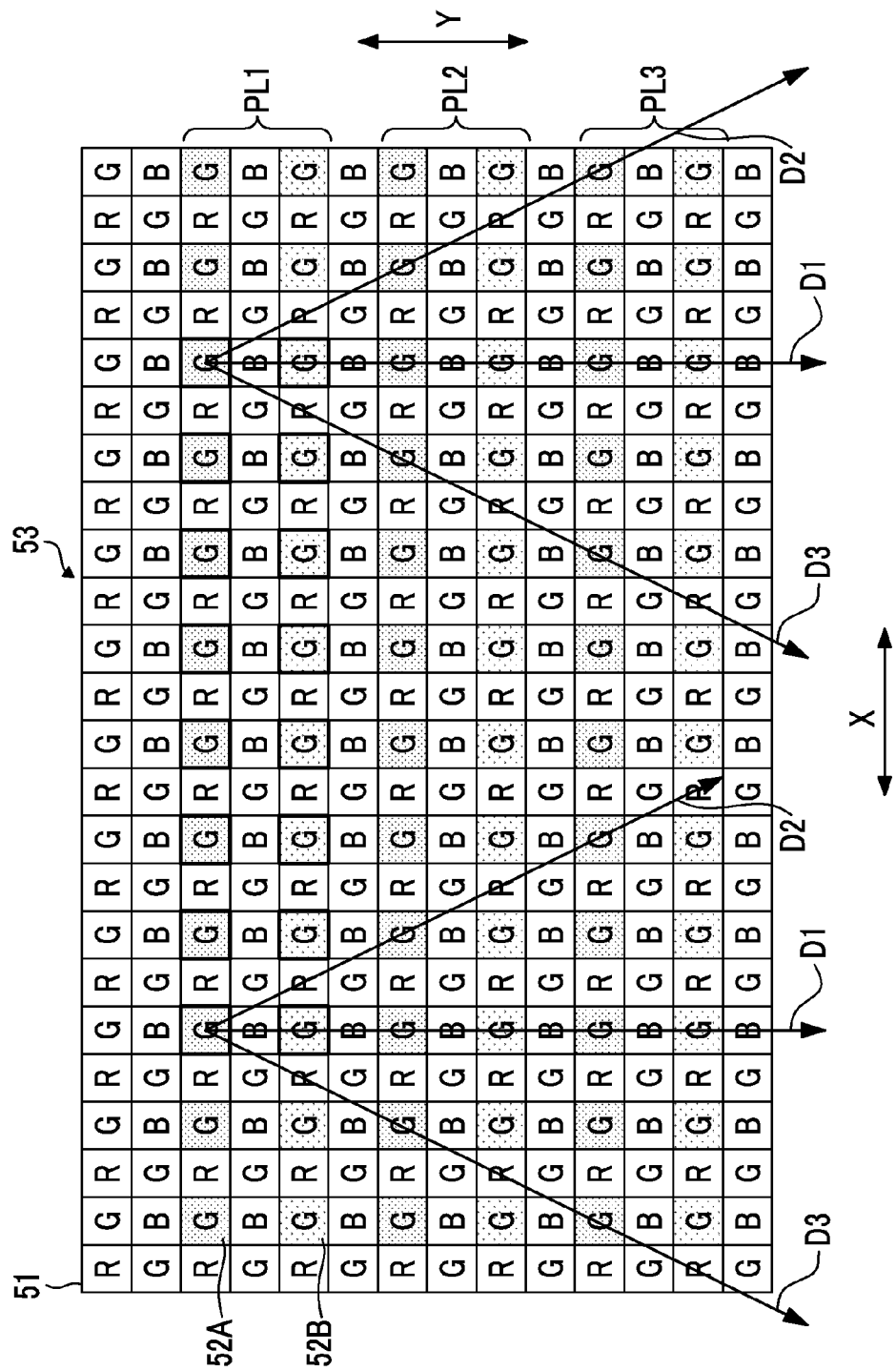
FIG. 6 is a diagram illustrating a method for determining a direction where a reliability of a correlation operation after addition becomes a maximum.

FIG. 6 is a diagram illustrating a method for determining a direction where a reliability of an addition correlation operation becomes a maximum. In FIG. 6, the AF area 53 shown in FIG. 3 is shown.

Plural phase difference detection pixels 52A (pixels surrounded by thick frames in the figure) arranged in the X direction in a pair line PL1 positioned on the top in FIG. 6 is referred to as a first addition reference pixel group, and phase difference detection pixels 52B (pixels surrounded by thick frames in the figure) that form pairs in combination with each of the plural phase difference detection pixels 52A is referred to as a second addition reference pixel group.

In the example of FIG. 6, in order to add detection signals in each of pair lines PL2 and PL3 to a detection signal of each phase difference detection pixel 52A of the first addition reference pixel group, three directions of a direction D1 which is the same direction as the Y direction, and directions D2 and D3 crossing both of the X direction and the Y direction may be set as crossing directions.

The phase difference AF processing unit 19 adds up a detection signal of each phase difference detection pixel 52A of the first addition reference pixel group, a detection signal of a phase difference detection pixel 52A in the pair line PL2 positioned in the direction D1 with respect to each of the phase difference detection pixels 52A, and a detection signal of a phase difference detection pixel 52A in the pair line PL3 positioned in the direction D1. A detection signal group of the phase difference detection pixels 52A after addition is referred to as SAd1.

Further, the phase difference AF processing unit 19 adds up a detection signal of each phase difference detection pixel 52B of the second addition reference pixel group, a detection signal of a phase difference detection pixel 52B in the pair line PL2 positioned in the direction D1 with respect to each of the phase difference detection pixel 52B, and a detection signal of a phase difference detection pixel 52B in the pair line PL3 positioned in the direction D1. A detection signal group of the phase difference detection pixels 52B after addition is referred to as SBd1.

Then, the phase difference AF processing unit 19 adds up a detection signal of each phase difference detection pixel 52A of the first addition reference pixel group, a detection signal of a phase difference detection pixel 52A in the pair line PL2 positioned in the direction D2 with respect to each of the phase difference detection pixel 52A, and a detection signal of a phase difference detection pixel 52A in the pair line PL3 positioned in the direction D2. A detection signal group of the phase difference detection pixels 52A after addition is referred to as SAd2.

Further, the phase difference AF processing unit 19 adds up a detection signal of each phase difference detection pixel 52B of the second addition reference pixel group, a detection signal of a phase difference detection pixel 52B in the pair line PL2 positioned in the direction D2 with respect to each of the phase difference detection pixel 52B, and a detection signal of a phase difference detection pixel 52B in the pair line PL3 positioned in the direction D2. A detection signal group of the phase difference detection pixels 52B after addition is referred to as SBd2.

Then, the phase difference AF processing unit 19 adds up a detection signal of each phase difference detection pixel 52A of the first addition reference pixel group, a detection signal of a phase difference detection pixel 52A in the pair line PL2 positioned in the direction D3 with respect to each of the phase difference detection pixel 52A, and a detection signal of a phase difference detection pixel 52A in the pair line PL3 positioned in the direction D3. A detection signal group of the phase difference detection pixels 52A after addition is referred to as SAd3.

Further, the phase difference AF processing unit 19 adds up a detection signal of each phase difference detection pixel 52B of the second addition reference pixel group, a detection signal of a phase difference detection pixel 52B in the pair line PL2 positioned in the direction D3 with respect to each of the phase difference detection pixel 52B, and a detection signal of a phase difference detection pixel 52B in the pair line PL3 positioned in the direction D3. A detection signal group of the phase difference detection pixels 52B after addition is referred to as SBd3.

The phase difference AF processing unit 19 performs a correlation operation with respect to the detection signal group SAd1 and the detection signal group SBd1, performs a correlation operation with respect to the detection signal group SAd2 and the detection signal group SBd2, and performs a correlation operation with respect to the detection signal group SAd3 and the detection signal group SBd3.

The correlation operation refers to an operation of calculating, when detection signals of one group are represented as A[1], . . . , A[k], detection signals of the other group are represented as B[1], . . . , B[k], and when two pieces of data are deviated by "d", an area S[d] surrounded by two data waveforms calculated by the following Expression (1). The area S[d] represents a correlation amount of two detection signal groups. As the area S[d] becomes smaller, a matching rate of two detection signal groups becomes higher.

$$S[d] = \sum_{n=1}^{k} (A[n+d] - B[n])^2 \quad (1)$$

$$d = -L, \ldots, -2, -1, 0, 1, 2, \ldots, L$$

The phase difference AF processing unit 19 compares a minimum value among areas S[d] which are results of the correlation operation of the detection signal group SAd1 and the detection signal group SBd1, a minimum value among areas S[d] which are results of the correlation operation of the detection signal group SAd2 and the detection signal group SBd2, with a minimum value among areas S[d] which are results of the correlation operation of the detection signal group SAd3 and the detection signal group SBd3. The phase difference AF processing unit 19 determines a direction where the smallest value of the minimum values of S[d] is obtained as a result, among the directions D1, D2, and D3 as a direction where a reliability of the result of the addition correlation operation is the highest.

In the above description, an example in which the addition correlation operations are respectively performed in three direction of the directions D1, D2, and D3 is shown, but it is sufficient if plural directions can be set. Assuming that a state where the X direction is vertical to a direction of gravity is a standard posture of a digital camera, since a subject has plural edges that extend in the Y direction, it is preferable that plural directions including at least the direction D1 and a direction crossing the direction D1 are set.

Then, an auto-focus operation of the digital camera shown in FIG. 1 will be described.

Figure 7:
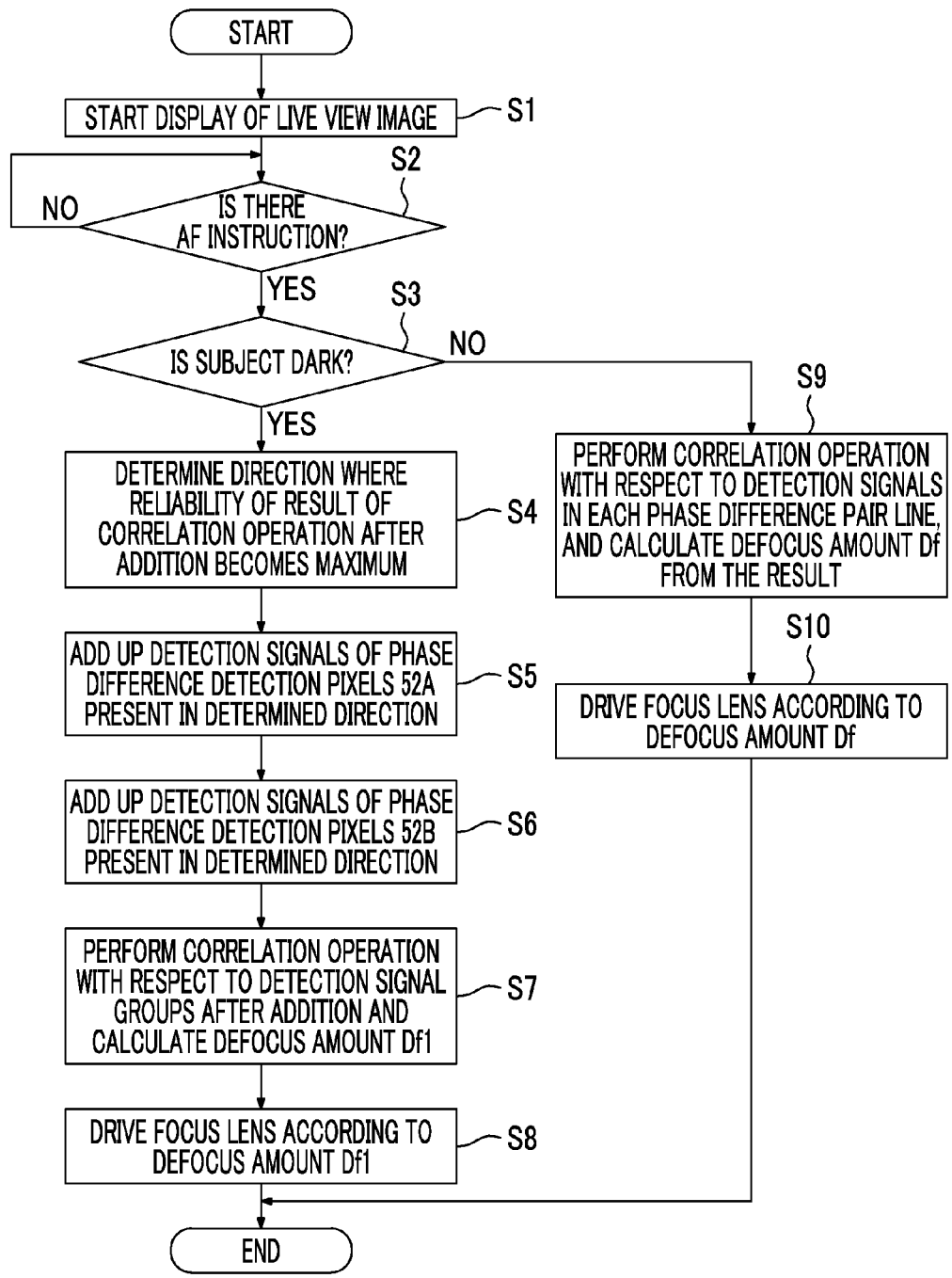
FIG. 7 is a flowchart illustrating an auto-focus operation of the digital camera shown in FIG. 1.

FIG. 7 is a flowchart illustrating an auto-focus operation of the digital camera shown in FIG. 1.

If the digital camera is set to an imaging mode, the system control unit 11 starts display of a live view image (step S1).

Specifically, the system control unit 11 repeats a control for imaging a subject using the imaging element 5 and displaying an image based on captured image data obtained through the imaging on the display unit 23.

After the display of the live view image is started, if an execution instruction (hereinafter, referred to as an auto-focus execution instruction, which is represented as an AF instruction in the figure) of a focusing control of the imaging optical system is given according to a half-push operation or the like of a shutter button provided in the operation unit 14 (step S2: YES), the system control unit 11 determines the brightness of a subject imaged by the imaging element 5 using the latest image signals (hereinafter, referred to as captured image signals Ga) among captured image signals obtained when the auto-focus execution instruction is given. For example, the system control unit 11 calculates an average or an integrated value of luminance values of the captured image signals Ga as the brightness.

If the calculated brightness is equal to or smaller than a threshold value (step S3: YES), the system control unit 11 causes the phase difference AF processing unit 19 to perform a process of step S4, and if the calculated brightness exceeds the threshold value (step S3: NO), the system control unit 11 causes the phase difference AF processing unit 19 to perform a process of step S9.

In step S9, the phase difference AF processing unit 19 performs a correlation operation with respect to a detection signal group of the phase difference detection pixels 52A and a detection signal group of the phase difference detection pixels 52B disposed in each of the pair lines PL1, PL2, and PL3 in a selected AF area 53, among the captured image signals Ga, to calculate defocus amounts Dfr with respect to each of the pair lines PL1, PL2, and PL3. Further, the phase difference AF processing unit 19 calculates an average value of the defocus amounts Dfr as a final defocus amount Df, and notifies the system control unit 11 of the defocus amount Df.

The system control unit 11 moves the focus lens to a focusing position corresponding to the defocus amount Df based on the defocus amount Df notified from the phase difference AF processing unit 19 (step S10), and completes auto-focusing.

In step S4, the phase difference AF processing unit 19 determines a direction where the reliability of the result of the addition correlation operation becomes a maximum by the method described in FIG. 6. Further, the phase difference AF processing unit 19 uses plural phase difference detection pixels 52A included in an arbitrary pair line of a selected AF area 53 as a first addition reference pixel group, and adds up respective detection signals of the plural phase difference detection pixels 52A and detection signals of phase difference detection pixels 52A in a different pair line positioned in the direction determined in step S4 with respect to each of the plural phase difference detection pixels 52A (step S5).

Further, the phase difference AF processing unit 19 uses phase difference detection pixels 52B that form pairs in combination with the respective phase difference detection pixels 52A of the first addition reference pixel group as a second addition reference pixel group, and adds up detection signals of the phase difference detection pixels 52B and detection signals of phase difference detection pixels 52B in the different pair line positioned in the direction determined in step S4 with respect to the phase difference detection pixels 52B (step S6).

Further, the phase difference AF processing unit 19 performs a correlation operation with respect to a detection signal group of the phase difference detection pixels 52A obtained through addition in step S5 and a detection signal group of the phase difference detection pixels 52A obtained through addition in step S6, and generates a defocus amount Df1 from the result of the correlation operation (step S7).

The result of the correlation operation in step S7 is also obtained when the direction is determined in step S4. Thus, steps S5 and S6 may not be performed, and in step S7, the defocus amount Df1 may be calculated from the result of the addition correlation operation calculated in step S4.

If the defocus amount Df1 is calculated in step S7, the defocus amount Df1 is notified to the system control unit 11. The system control unit 11 moves the focus lens to a focusing position corresponding to the defocus amount Df1 based on the defocus amount Df1 (step S8), and completes auto-focusing. The system control unit 11 functions as a focusing control unit.

As described above, according to the digital camera shown in FIG. 1, even when a subject is dark, since detection signals of the phase difference detection pixels 52A (52B) are added up at plural rows and a correlation operation is performed, it is possible to prevent reduction in the accuracy of calculation of a defocus amount. Further, since detection signals are added up with respect to phase difference detection pixels disposed in a direction where the reliability of the result of the addition correlation operation becomes a maximum, it is possible to enhance the accuracy of calculation of a defocus amount, compared with a case where detection signals are added up with respect to phase difference detection pixels disposed in the same direction.

In step S4 in FIG. 7, the phase difference AF processing unit 19 sets plural directions as crossing directions to perform addition correlation operations, compares results of the addition correlation operations in the plural directions, and determines a direction where the reliability of the addition correlation operation becomes a maximum.

The phase difference AF processing unit 19 may determine a direction where contrast of a subject image formed in a selected AF area 53 becomes a minimum as a maximum reliability direction. If contrast in a certain direction is small, this means that the number of edges crossing the direction is small or an edge is not present. Thus, the reliability of the result of the addition correlation operation performed in the direction becomes high.

For example, in the AF area 53, a first imaging pixel group that includes imaging pixels 51 disposed in lower left portions with respect to each phase difference detection pixel 52A in the pair line PL1, a second imaging pixel group that includes imaging pixels 51 disposed in lower left portions with respect to each phase difference detection pixel 52A in the pair line PL2, and a third imaging pixel group that includes imaging pixels 51 in lower left portions with respect to each phase difference detection pixel 52A in a pair line PL3 are considered.

The phase difference AF processing unit 19 calculates differences between detection signals in adjacent imaging pixels 51, using each imaging pixel 51 of the first imaging pixel group and each imaging pixel 51 of the second imaging pixel group and each imaging pixel 51 of the third imaging pixel group disposed in the direction D1 with respect to each imaging pixel 51 of the first imaging pixel group. Further, the phase difference AF processing unit 19 calculates an integrated value of the differences as a contrast value of the subject image formed in the AF area 53 in the direction D1. The phase difference AF processing unit 19 changes the direction D1 into the directions D2 and D3 to calculate contrast values in a similar way, and may set a direction where the contrast value becomes small as a maximum reliability direction.

Alternatively, the phase difference AF processing unit 19 calculates differences between detection signals in adjacent phase difference detection pixels 52A (or 52B), using each phase difference detection pixel 52A (or 52B) in the pair line PL1 of the AF area 53 and each phase difference detection pixel 52A (or 52B) in the pair lines PL2 and PL3 disposed in the direction D1 with respect to each phase difference detection pixel 52A (or 52B). Further, the phase difference AF processing unit 19 calculates an integrated value of the differences as a contrast value of the subject image formed in the AF area 53 in the direction D1. The phase difference AF processing unit 19 changes the direction D1 into the directions D2 and D3 to calculate contrast values in a similar way, and may set a direction where the contrast value becomes small as a maximum reliability direction.

According to this configuration, since detection signals of the phase difference detection pixels 52A or the phase difference detection pixels 52B are used for contrast calculation, it is possible to enhance the accuracy of determination of a maximum reliability direction, compared with a method using detection signals of the imaging pixels 51 for contrast calculation.

The phase difference AF processing unit 19 may determine a direction which is closest to the direction of gravity among plural settable directions as a maximum reliability direction.

A subject which is present in the natural world has plural edges parallel to the direction of gravity. Thus, if detection signals are added up the phase difference detection pixels 52A and 52B in the pair line PL1 and the phase difference detection pixels 52A and 52B in the pair lines L2 and L3 present in the same direction as the direction of gravity with respect to the phase difference detection pixels 52A and 52B in the pair line PL1, the addition is performed based on edges. Accordingly, in this case, a probability that the reliability of the addition correlation operation becomes high is high.

Accordingly, a gravity direction detection unit for detecting the direction of gravity such as an electronic level is provided in the digital camera of FIG. 1. Thus, the phase difference AF processing unit 19 determines the direction of gravity detected by the gravity direction detection unit as a direction where the reliability of the addition correlation operation becomes a maximum, in step S4 of FIG. 7. In this way, it is possible to reduce a computation, and to achieve energy saving.

There is a case where it is possible to know which direction edges mainly extend in beforehand according to the type of a subject to be imaged by a digital camera. For example, a human face, a tree or the like have plural longitudinal components. Thus, imaged scenes and information about a direction where the reliability becomes a maximum are stored in the main memory 16 of the digital camera in association.

Further, in step S4 in FIG. 7, the phase difference AF processing unit 19 acquires, from a set imaged scene, information about a direction associated with the set imaged scene, and determines the direction as a direction where the reliability of the addition correlation operation becomes a maximum. In this way, it is possible to reduce a computation, and to achieve energy saving.

In the operation example of FIG. 7, the process of step S4 and the subsequent processes are performed when a subject is dark. However, a case where it is necessary to add up detection signals of phase difference detection pixels is not limited to a case where a subject is dark, but also includes a situation where detection signal levels of the phase difference detection pixels 52A and 52B are low.

For example, in a case where an angle of a beam incident onto the imaging element 5 is large so that the intensity of light incident onto the phase difference detection pixels 52A and 52B is small (in wide angle imaging), the process of step S4 and the subsequent processes may be performed. Further, in a case where levels of detection signals of the phase difference detection pixels 52A and 52B are low, the process of step S4 and the subsequent processes may be performed.

Further, the imaging element 5 is not limited to the configurations shown in FIGS. 2 to 5, but may have a configuration in which a plurality of pairs including a first signal detection unit and a second signal detection unit is provided.

For example, a configuration in which all pixels included in the imaging element 5 are used as imaging pixels 51 and each imaging pixel 51 is divided into two parts, in which one divided area is used as a phase difference detection pixel 52A and the other divided area is used as a phase difference detection pixel 52B, may be used.

Figure 8:
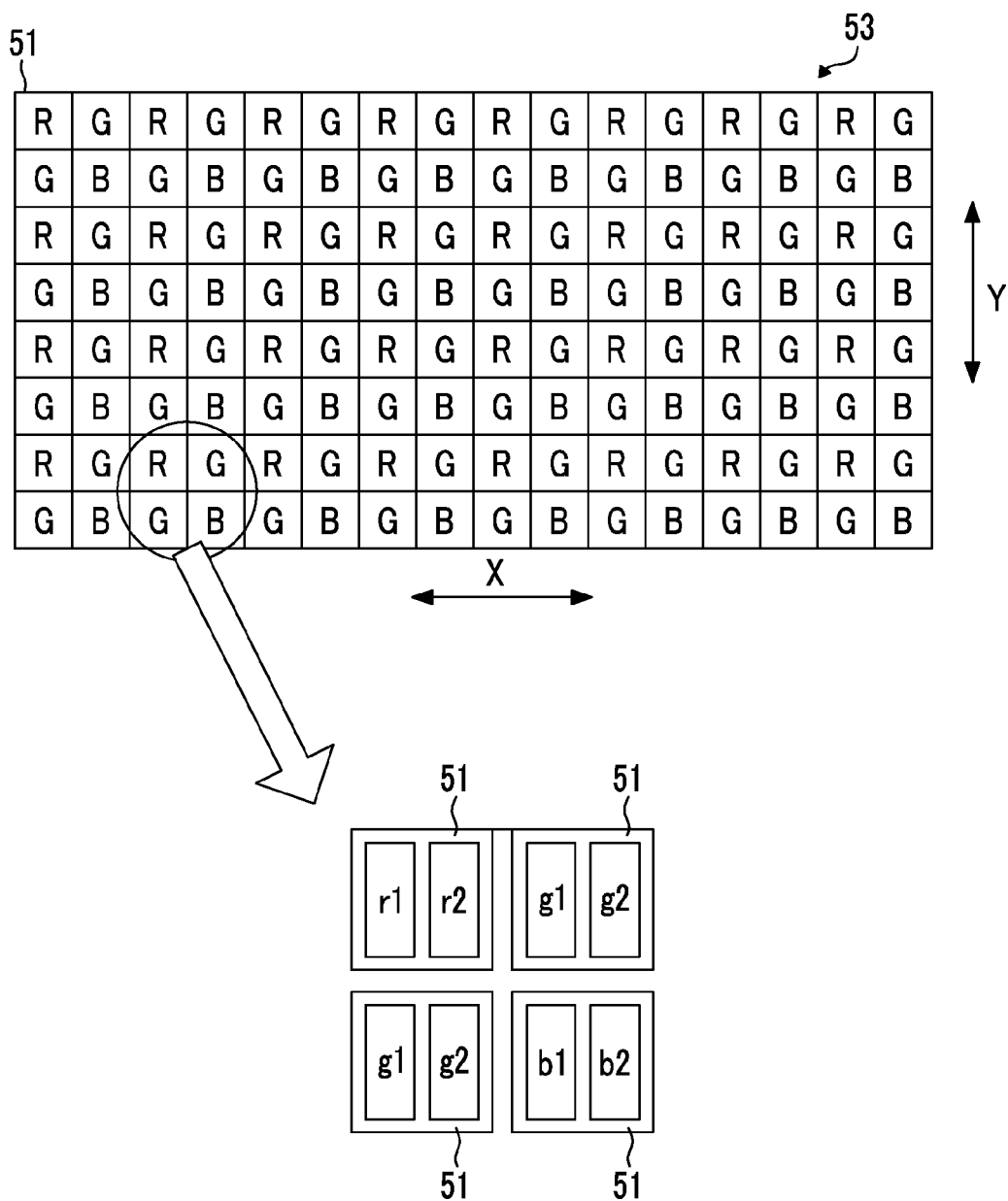
FIG. 8 is a diagram illustrating a modification example of the imaging element 5 of the digital camera shown in FIG. 1.

FIG. 8 is a diagram illustrating a configuration in which all pixels included in the imaging element 5 are used as imaging pixels 51 and each imaging pixel 51 is divided into two parts.

In the configuration of FIG. 8, each imaging pixel 51 with R in the imaging element 5 is divided into two parts, and the divided two parts are used as a phase difference detection pixel r1 and a phase difference detection pixel r2, respectively.

Further, each imaging pixel 51 with G in the imaging element 5 is divided into two parts, and the divided two parts are used as a phase difference detection pixel g1 and a phase difference detection pixel g2, respectively.

Furthermore, each imaging pixel 51 with B in the imaging element 5 is divided into two parts, and the divided two parts are used to as a phase difference detection pixel b1 and a phase difference detection pixel b2, respectively.

In this configuration, the phase difference detection pixels r1, g1, and b1 serve as the first signal detection units, respectively, and the phase difference detection pixels r2, g2, and b2 serve as the second signal detection units, respectively. It is possible to read signals independently from the first signal detection units and the second signal detection units.

Further, if signals of the first signal detection units and the second signal detection units are added up, normal imaging signals are obtained without a phase difference. In this way, in the configuration of FIG. 6, it is possible to use all pixels as both of phase difference detection pixels and imaging pixels.

In the configuration of FIG. 8, for example, a pair line is formed by phase difference detection pixels g1 and g2 in a first row, a pair line is formed by phase difference detection pixels g1 and g2 in a third row, a pair line is formed by phase difference detection pixels g1 and g2 in a fifth row, and a pair line is formed by phase difference detection pixels g1 and g2 in a seventh row.

In this embodiment, an example in which the digital camera is used as the imaging device is shown, but hereinafter, an embodiment in which a smart phone with a camera is used as the imaging device will be described.

Figure 9:
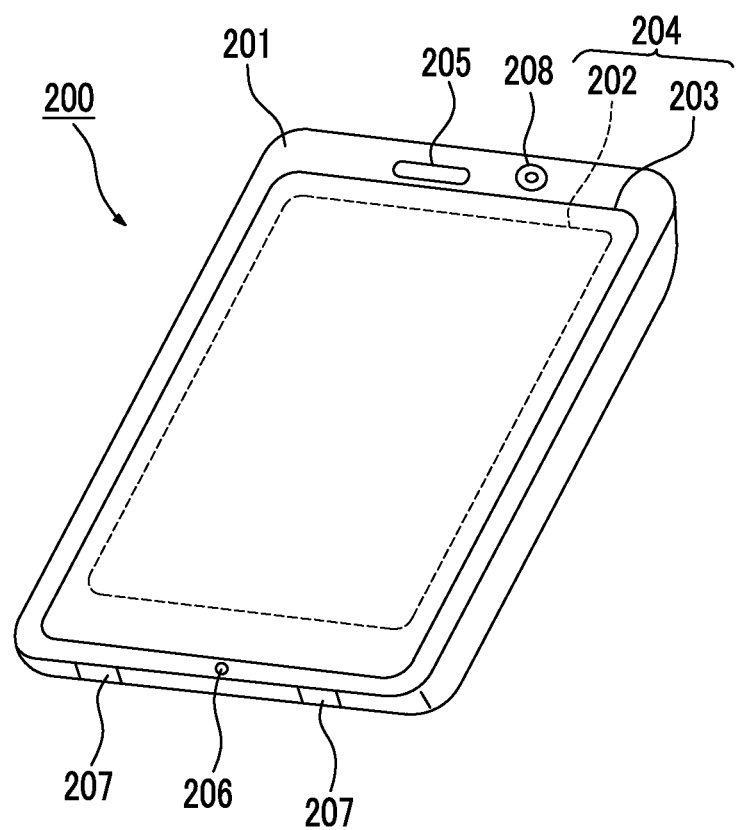
FIG. 9 is a diagram illustrating a smart phone which is an imaging device.

FIG. 9 is a diagram showing an appearance of a smart phone 200 which is an embodiment of the imaging device of the invention. The smart phone 200 shown in FIG. 9 includes a flat housing 201, and a display input unit 204 that is disposed on one surface of the housing 201 and includes a display panel 202 which is a display unit and an operation panel 203 which is an input unit, in which the display panel 202 and the operation panel 203 are integrally formed. Further, the housing 201 includes a speaker 205, a microphone 206, an operation unit 207, and a camera unit 208. The configuration of the housing 201 is not limited thereto, and for example, a configuration in which the display unit and the input unit are independently provided may be employed, or a configuration in which a folding structure or a slide mechanism is provided may be employed.

Figure 10:
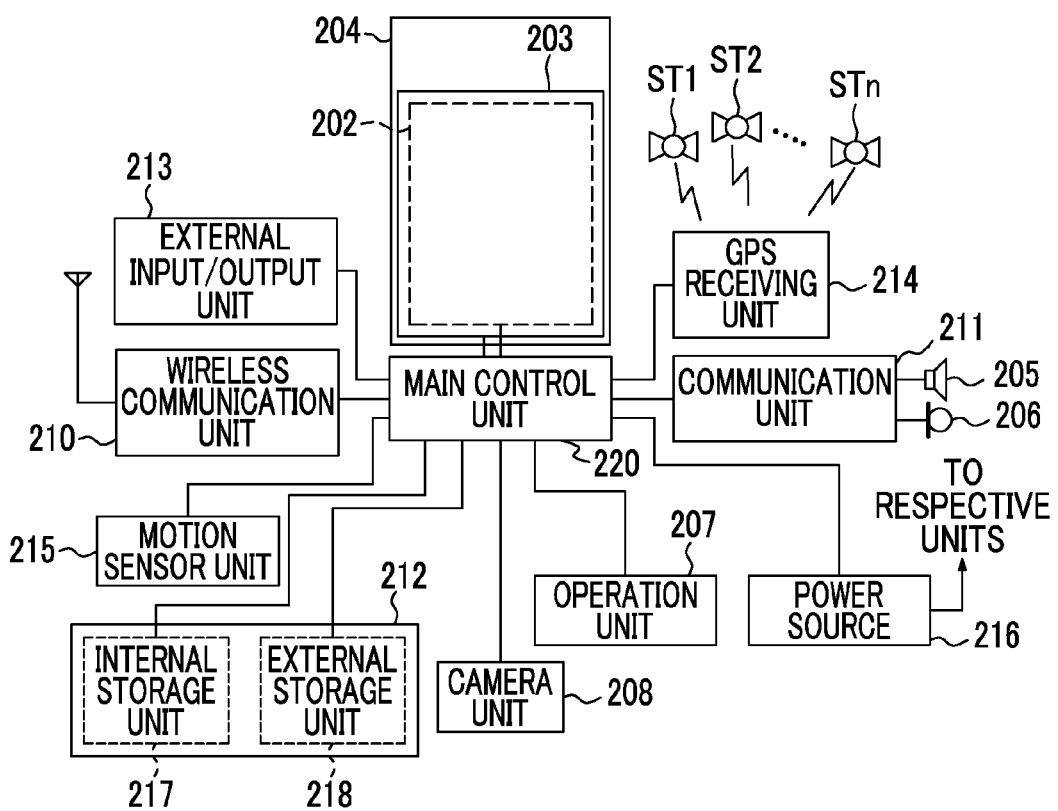
FIG. 10 is an internal block diagram illustrating the smart phone shown in FIG. 9.

FIG. 10 is a block diagram illustrating the configuration of the smart phone 200 shown in FIG. 9. As shown in FIG. 10, as main components of the smart phone, a wireless communication unit 210, the display input unit 204, a communication unit 211, the operation unit 207, the camera unit 208, a storage unit 212, an external input/output unit 213, a global positioning system (GPS) receiving unit 214, a motion sensor unit 215, a power source 216, and a main control unit 220 are provided. Further, as main functions of the smart phone 200, a wireless communication function for performing mobile wireless communication through a base station device BS (not shown) and a mobile communication network NW (not shown) is provided.

The wireless communication unit 210 performs wireless communication with respect to the base station device BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (a static image and a video image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OELD), or the like as a display device.

The operation panel 203 is a device that is mounted so that an image displayed on a display surface of the display panel 202 can be visually recognized and detects one or plural coordinates operated by a user's finger or a stylus. In the case that the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 9, the display panel 202 and the operation panel 203 of the smart phone 200 shown as an example of the imaging device of the invention are integrated to form the display input unit 204, in which the operation panel 203 is arranged to completely cover the display panel 202.

In a case where such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may be completely the same, but it is not essential that both of the sizes are the same. Further, the operation panel 203 may include two sensitive regions of an outer edge portion and an inner portion other than the outer edge portion. Further, the width of the outer edge portion is appropriately set according to the size of the housing 201, or the like. Furthermore, as a position detecting method employed in the operation panel 203, any one of a matrix switch type, a resistive film type, a surface acoustic wave type, an infrared type, an inductive coupling type, an electrostatic capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 9, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from the user. For example, as shown in FIG. 9, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 built in the smart phone, and an external storage section 218 provided with a detachable and attachably memory slot. Each of the respective internal storage section 217 and the external storage section 218 that form the storage unit 212 is realized using a storage medium such as a flash memory type, a hard disk type, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As an external device to be connected to the smart phone 200, for example, a wired or wireless headset, a wired or wireless external charger, a wired or wireless data port, a memory card, a subscriber identity module (SIM) or a user identity module (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, both a personal computer and a PDA connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including latitude, longitude and altitude. When position information can be acquired from the wireless communication unit 210 or the external input/output unit 213 (for example, wireless LAN), the GPS receiving unit 214 can also detect the position using the position information.

The motion sensor unit 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mails, a Web browsing function for browsing Web pages, or the like is used.

Further, the main control unit 220 has an image processing function, for example, for displaying an image on the display input unit 204 based on image data (data on a static image or a video image) such as received data or downloaded streaming data. The image processing function refers to a function for decoding the image data, performing image processing with respect to the decoded image data, and displaying an image on the display input unit 204, by the main control unit 220.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a soft key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Further, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

In addition, the main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, and the operation unit 14 in the digital camera shown in FIG. 1. The captured image data generated by the camera unit 208 may be recorded in the storage unit 212, or may be output through the input/output unit 213 or the wireless communication unit 210. In the smart phone 200 shown in FIG. 9, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203. Further, when detecting the position using the GPS receiving unit 214, it is possible to detect the position with reference to the image from the camera unit 208. In addition, it is possible to determine an optical axis direction or a current usage environment of the camera unit 208 of the smart phone 200 without using the triaxial acceleration sensor or by using the triaxial acceleration sensor in combination with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor unit 215, or the like may be added to the image data on a static image or a video image, and the result may be recorded in the storage unit 212, or may be output through the input/output unit 213 or the wireless communication unit 210.

In the smart phone 200 with the above-described configuration, similarly, by using the imaging element 5 as the imaging element of the camera unit 208, and by performing the processes shown in FIG. 7 in the main control unit 220, it is possible to perform a focusing control with high accuracy regardless of subjects even when levels of detection signals of phase difference detection pixels are low.

As described above, this specification discloses the following content.

According to the disclosure, an imaging device includes an imaging element that includes a pair line in which a plurality of pairs of a first signal detection unit that detects a signal corresponding to a beam that passes through a divided region among divided regions of a pupil region divided in a specific direction in an imaging optical system and a second signal detection unit that detects a signal corresponding to a beam that passes through the other divided region is arranged in the specific direction, in which the plurality of pair lines is arranged in a direction orthogonal to the specific direction; a defocus amount generation unit that generates a defocus amount from a result of a correlation operation performed with respect to a plurality of detection signals obtained by adding up detection signals of the plurality of first signal detection units in an arbitrary pair line present in an area where the plurality of pair lines is arranged and detection signals of first signal detection units in a different pair line in the area, present in a crossing direction crossing the specific direction with respect to each of the plurality of respective first signal detection units, and a plurality of detection signals obtained by adding up detection signals of the second signal detection units that forms pairs in combination with each of the plurality of first signal detection units in the arbitrary pair line and detection signals of the second signal detection units in the different pair line in the area, present in the crossing direction with respect to the second signal detection units; a direction determination unit that determines a direction where a reliability of the result of the correlation operation becomes a maximum among a plurality of directions as the crossing direction; and a focusing control unit that performs a focusing control for the imaging optical system based on the defocus amount generated by the defocus amount generation unit from the result of the correlation operation performed using the direction determined by the direction determination unit as the crossing direction.

In the disclosed imaging device, the direction determination unit may set each of the plurality of directions as the crossing direction to perform the correlation operation, and may determine the direction where the reliability becomes a maximum by comparing the results of the correlation operations with respect to the plurality of respective directions.

In the disclosed imaging device, the direction determination unit may determine a direction where contrast of a subject image formed in the area becomes a minimum as the direction where the reliability becomes a maximum.

In the disclosed imaging device, the direction determination unit may calculate the contrast by integrating differences between detection signals of adjacent signal detection units using the plurality of respective first signal detection units or the plurality of respective second signal detection units in the arbitrary pair line and the first signal detection units or the second signal detection units in the different pair line in the area, present in the plurality of respective directions with respect to the plurality of respective first signal detection units or the plurality of respective second signal detection units in the arbitrary pair line.

In the disclosed imaging device, the direction determination unit may determine a direction which is closest to a direction of gravity among the plurality of directions as the direction where the reliability becomes a maximum.

According to the disclosure, a focusing control method includes: a defocus amount generation step of generating a defocus amount from a result of a correlation operation performed with respect to a plurality of detection signals obtained by adding up detection signals of the plurality of first signal detection units in an arbitrary pair line present in an area where the plurality of pair lines is arranged and detection signals of the plurality of first signal detection units in a different pair line in the area, present in a crossing direction crossing the specific direction with respect to the plurality of respective first signal detection units, and a plurality of detection signals obtained by adding up detection signals of the plurality of second signal detection units that forms pairs in combination with each of the plurality of first signal detection units in the arbitrary pair line and detection signals of the plurality of second signal detection units in the different pair line in the area, present in the crossing direction with respect to the second signal detection units, the detection signals being output from an imaging element that includes a pair line in which a plurality of pairs of a first signal detection unit that detects a signal corresponding to a beam that passes through a divided region among divided regions of a pupil region divided in a specific direction in an imaging optical system and a second signal detection unit that detects a signal corresponding to a beam that passes through the other divided region is arranged in the specific direction, in which the plurality of pair lines is arranged in a direction orthogonal to the specific direction; a direction determination step of determining a direction where a reliability of the result of the correlation operation becomes a maximum among a plurality of directions as the crossing direction; and a focusing control step of performing a focusing control for the imaging optical system based on the defocus amount generated in the defocus amount generation step from the result of the correlation operation performed using the direction determined in the direction determination step as the crossing direction.

INDUSTRIAL APPLICABILITY

The present invention is applied to a digital camera or the like to provide high convenience and effectiveness.

EXPLANATION OF REFERENCES

1: imaging lens
2: diaphragm
5: imaging element
11: system control unit (focusing control unit)
19: phase difference AF processing unit (defocus amount generation unit, direction determination unit)
50: imaging surface
51: pixel
52A, 52B: phase difference detection pixel
53: AF area

What is claimed is:

1. An imaging device comprising:
an imaging element that includes a pair line in which a plurality of pairs of a first signal detection pixel that detects a signal corresponding to a beam that passes through a divided region among divided regions of a pupil region divided in a specific direction in an imaging optical system and a second signal detection pixel that detects a signal corresponding to a beam that passes through the other divided region is arranged in the specific direction, in which the plurality of pair lines is arranged in a direction orthogonal to the specific direction; and
at least one of processors configured to
generate a defocus amount from a result of a correlation operation performed with respect to a plurality of detection signals obtained by adding up detection signals of the plurality of first signal detection units in an arbitrary pair line present in an area where the plurality of pair lines is arranged and detection signals of the first signal detection pixels in a different pair line in the area, present in a crossing direction crossing the specific direction with respect to each of the plurality of respective first signal detection pixels, and a plurality of detection signals obtained by adding up detection signals of the second signal detection pixels that forms pairs in combination with each of the plurality of first signal detection pixels in the arbitrary pair line and detection signals of the second signal detection pixels in the different pair line in the area, present in the crossing direction with respect to the second signal detection pixels;
determine a direction where a reliability of the result of the correlation operation becomes a maximum among a plurality of directions as the crossing direction; and
perform a focusing control for the imaging optical system based on the generated defocus amount from the result of the correlation operation performed using the determined direction as the crossing direction.

2. The imaging device according to claim 1,
wherein the processor sets each of the plurality of directions as the crossing direction to perform the correlation operation, and determines the direction where the reliability becomes a maximum by comparing the results of the correlation operations with respect to the plurality of respective directions.

3. The imaging device according to claim 1,
wherein the processor determines a direction where contrast of a subject image formed in the area becomes a minimum as the direction where the reliability becomes a maximum.

4. The imaging device according to claim 3,
wherein the processor calculates the contrast by integrating differences between detection signals of adjacent signal detection pixels using the plurality of respective first signal detection pixels or the plurality of respective second signal detection pixels in the arbitrary pair line and the first signal detection pixels or the second signal detection pixels in the different pair line in the area, present in the plurality of respective directions with respect to the plurality of respective first signal detection pixels or the plurality of respective second signal detection pixels in the arbitrary pair line.

5. The imaging device according to claim 1,
wherein the processor determines a direction which is closest to a direction of gravity among the plurality of directions as the direction where the reliability becomes a maximum.

6. A focusing control method of the imaging device according to claim 1 comprising:
a defocus amount generation step of generating a defocus amount from a result of a correlation operation performed with respect to a plurality of detection signals obtained by adding up detection signals of the plurality of first signal detection pixels in an arbitrary pair line present in an area where the plurality of pair lines is arranged and detection signals of the plurality of first signal detection pixels in a different pair line in the area, present in a crossing direction crossing the specific direction with respect to the plurality of respective first signal detection pixels, and a plurality of detection signals obtained by adding up detection signals of the plurality of second signal detection pixels that forms pairs in combination with each of the plurality of first signal detection pixels in the arbitrary pair line and detection signals of the second signal detection pixels in the different pair line in the area, present in the crossing direction with respect to the second signal detection pixels, the detection signals being output from an imaging element that includes a pair line in which a plurality of pairs of a first signal detection pixel that detects a signal corresponding to a beam that passes through a divided region among divided regions of a pupil region divided in a specific direction in an imaging optical system and a second signal detection pixel that detects a signal corresponding to a beam that passes through the other divided region is arranged in the specific direction, in which the plurality of pair lines is arranged in a direction orthogonal to the specific direction;

a direction determination step of determining a direction where a reliability of the result of the correlation operation becomes a maximum among a plurality of directions as the crossing direction; and a focusing control step of performing a focusing control for the imaging optical system based on the defocus amount generated in the defocus amount generation step from the result of the correlation operation performed using the direction determined in the direction determination step as the crossing direction.

* * * * *